United States Patent
Su et al.

(10) Patent No.: US 7,557,553 B2
(45) Date of Patent: Jul. 7, 2009

(54) POWER SUPPLY CIRCUIT AND CONTROL METHOD THEREOF

(75) Inventors: Hung-Der Su, Luju Township, Kaohsiung County (TW); Jing-Meng Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 347 days.

(21) Appl. No.: 11/650,525

(22) Filed: Jan. 8, 2007

(65) Prior Publication Data

US 2007/0176636 A1    Aug. 2, 2007

(30) Foreign Application Priority Data

Jan. 11, 2006    (TW) .............................. 95101090 A

(51) Int. Cl.
*H03K 19/0175* (2006.01)

(52) U.S. Cl. .................................................. 323/282
(58) Field of Classification Search ................. 323/271, 323/282, 283, 351; 363/271
See application file for complete search history.

(56) References Cited

U.S. PATENT DOCUMENTS

| | | | |
|---|---|---|---|
| 5,191,279 A * | 3/1993 | Zommer ..................... 323/354 |
| 6,703,885 B1 * | 3/2004 | Fan et al. ..................... 327/308 |
| 6,737,841 B2 * | 5/2004 | Wrathall ..................... 323/282 |
| 6,954,057 B2 * | 10/2005 | Balakrishnan et al. ...... 323/314 |

* cited by examiner

*Primary Examiner*—Tung S Lau
*Assistant Examiner*—Yemane Mehari
(74) *Attorney, Agent, or Firm*—Rosenberg, Klein & Lee

(57) ABSTRACT

A power supply circuit and a control method are provided, in which the original enable pad and output pad, or the enable pad and feedback pad are used to trim the output voltage of the power supply circuit without extra trim pads.

38 Claims, 9 Drawing Sheets

POWER SUPPLY CIRCUIT AND CONTROL METHOD THEREOF

FIELD OF THE INVENTION

The present invention is related generally to power supplies and control methods thereof.

BACKGROUND OF THE INVENTION

In current semiconductor processes, the electrical characteristics of an integrated circuit (IC), for example a resistance, a capacitance, or the gain of a transistor, are still unable to have ideal values as the circuit design absolutely. These errors on the electrical characteristics may cause the efficiency of the IC degraded or incorrect operation. In conventional power supplies, for example a low drop-out (LDO) regulator or a DC-to-DC converter, a trimmer is used to trim the circuit so as to reduce the error of the output voltage which will require extra trim pads and thereby greater chip area and higher cost. To reduce the number of pads, U.S. Pat. No. 6,703,885 to Fan et al. proposed a trimmer method and device. However, this method and device still require at least one trim pad.

SUMMARY OF THE INVENTION

An object of the present invention is to provide a trim pad free method and circuit for power supplies.

According to the present invention, a power supply circuit comprises an output pad, an enable pad, a feedback, a trim circuit, and a voltage regulator. The trim circuit includes a variable resistor coupled to the voltage regulator. In a normal mode, an enable signal to the enable pad enables the power supply, such that the voltage regulator generates an output voltage to the output pad, and the output voltage is fed back to the power supply circuit. In a test mode, the voltage regulator provides a first voltage proportional to the output voltage for the trim circuit, a test signal applied to the enable pad enables the trim circuit, a second voltage is coupled to the output pad, and the trim circuit adjusts the variable resistor based on the test signal and the first and second voltages to trim the output voltage.

Since it is the original enable pad and output pad, or the original enable pad and feedback pad used for the trim circuit to trim the output voltage, no extra trim pad is required.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
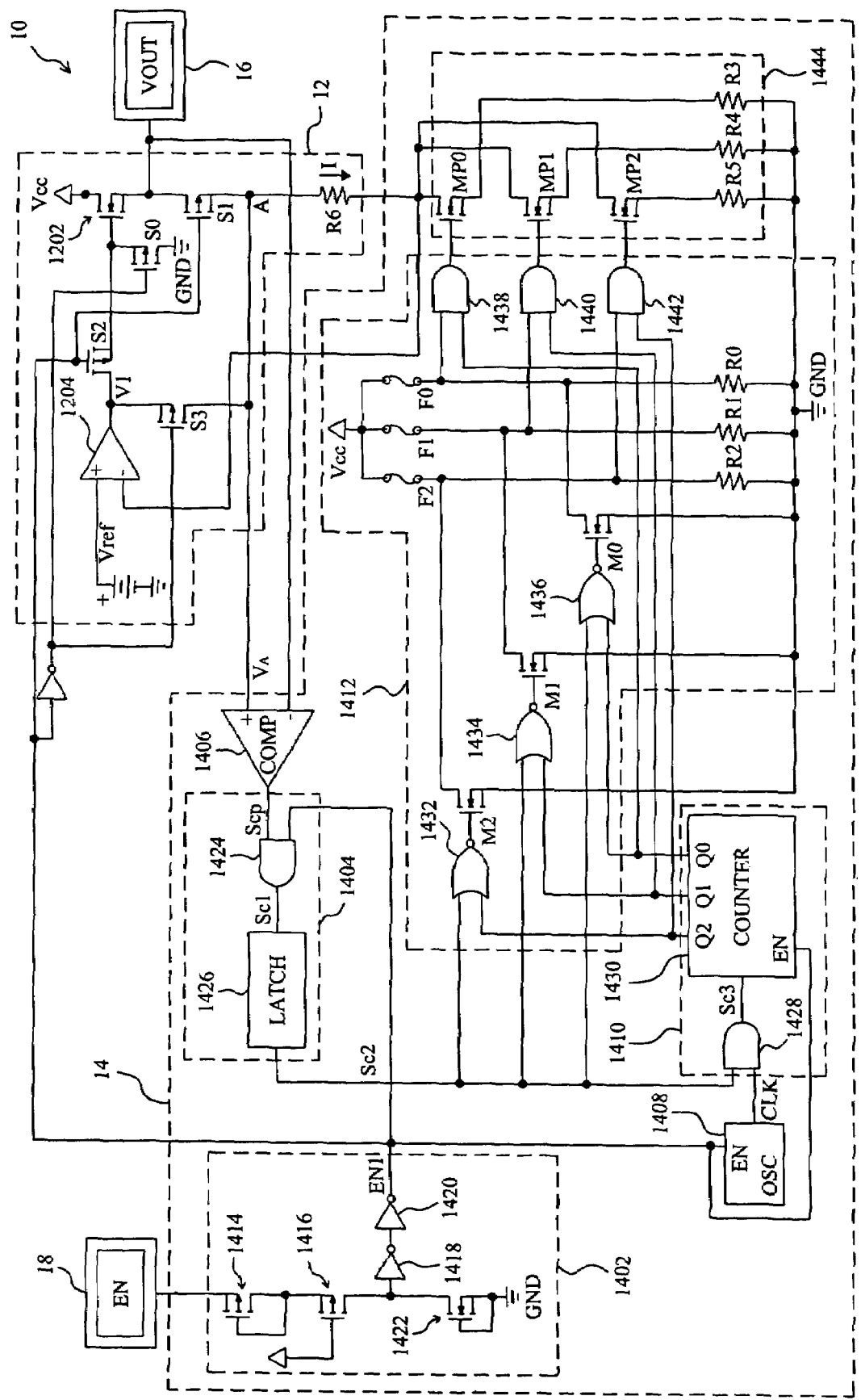
FIG. 1 shows a first embodiment of the present invention.

FIG. 1 shows a first embodiment of the present invention. A power supply circuit 10 comprises a LDO regulator 12 as a voltage regulator, a trim circuit 14, an output pad 16, and an enable pad 18. The LDO regulator 12 includes a transistor 1202 coupled between a power source Vcc and the output pad 16, a switch S0 coupled between the gate of the transistor 1202 and ground GND, a switch S1 coupled between the output pad 16 and the trim circuit 14, an error amplifier 1204 having a non-inverting input coupled to a reference voltage Vref and an inverting input coupled to the output pad 16 through a resistor R6 and the switch S1. The error amplifier 1204 generates a voltage V1 in response to its inputs, which is coupled to the gate of the transistor 1202 and the trim circuit 14 through switches S2 and S3, respectively. In the trim circuit 14, an enable circuit 1402 generates an enable signal EN1 based on the signal from the enable pad 18, the enable circuit 1402 includes transistors 1414, 1416, and 1422 coupled in series between the enable pad 18 and ground GND, in which the transistor 1422 is a depletion mode transistor, a pair of inverters 1418 and 1420 are coupled in series between the drain of the transistor 1416 and a terminal to provide the enable signal EN1, a comparator 1406 compares its two inputs to generate a comparison signal Scp, a logic circuit 1404 includes a AND gate 1424 and a latch 1426, the AND gate 1424 generates a signal Sc 1 based on the comparison signal Scp and the enable signal EN1, the latch 1426 generates a signal Sc2 based on the signal Sc1, an oscillator 1408 is enabled by the enable signal EN1 to generate a clock CLK for a logic circuit 1410 to generate signals Q0, Q1, and Q2, the logic circuit 1410 includes a AND gate 1428 and a counter 1430, the AND gate 1428 generates a signal Sc3 based on the signal Sc2 and the clock CLK, the counter 1430 is enabled to generate the signals Q0, Q1, and Q3 based on the signal Sc3, a variable resistor 1444 is coupled to the LDO regulator 12, and a control circuit 1412 adjusts the variable resistor 1444 based on the signals Sc2 and Sc3 to trim the output voltage VOUT. In the control circuit 1412, NOR gates 1432, 1434, and 1436 control switches M2, M1, and M0 based on the signals Q2, Q1, Q0 and Sc3, each of the switches M0, M1, and M2 corresponds to one of fuses F0, F1, and F2, and the fuses F0, F1, and F2 are polysilicon resistors. When the switch M0, M1, or M2 turns on, the corresponding fuse F0, F1, or F2 will be blown out for the voltage across resistor R0, R1, or R2 to be zero, and AND gates 1438, 1440, and 1442 control switches MP0, MP1, and MP2 based on the voltage across the resistor R0, R1, or R2 and the signals Q0, Q1, and Q2 to determine the resistance of the variable resistor 1444.

In a normal mode, the enable signal EN from the enable pad 18 signals the enable circuit 1402 to generate a low-level enable signal EN1, by which the switches S0 and S3 are turned off, the switches S1 and S2 are turned on, and the oscillator 1408 and the counter 1430 are turned off, therefore the trim circuit 14 does not perform trim function, the error amplifier 1204 generates the voltage V1 in response to its two inputs to control the channel size of the transistor 1202 by the switch S2 to generate the output voltage VOUT to the output pad 16, and the output voltage VOUT is divided by a resistor R6 and the variable resistor 1444 to feed back to the inverting input of the error amplifier 1204 to regulate the output voltage VOUT at a target value. According to the LDO regulator 12 shown in FIG. 1, the current flowing through the resistor R6 and the variable resistor 1444 is $$I = \frac{VOUT}{R6 + R_{eq}}, \quad [\text{EQ-1}]$$

where $R_{eq}$ is the resistance of the variable resistor 1444. On the other hand, because of the virtual short between the two inputs of the error amplifier 1204, the current is also determined to be $$I = \frac{Vref}{R_{eq}}. \quad [\text{EQ-2}]$$

It may be obtained from the equations EQ-1 and EQ-2 that $$VOUT = I \times R6 + Vref. \quad [\text{EQ-3}]$$

In a test mode, the test signal applied to the enable pad 18 signals the enable circuit 1402 to generate a high-level enable signal EN1, by which the switches S0 and S3 are turned on, the switches S1 and S2 are turned off, and the oscillator 1408 and the counter 1430 are enabled, and therefore the trim circuit 14 is activated to perform trim function. When the test signal is applied to the enable pad 18, a target voltage is also provided the output pad 16. The target voltage is a desired output voltage VOUT the designer determines. Since the switch S0 is on and the switch S1 is off, the target voltage is coupled to the inverting input of the comparator 1406 from the output pad 16. Further, since the switches S1 and S2 are off, the switch S3 is on, the two inputs of the error amplifier 1204 are virtually short, the current I flowing through the variable resistor 1444 is obtained as the equation EQ-2, and the voltage at the non-inverting input A is $$V_A = I \times R6 + R_{eq} = I \times R6 + Vref. \quad [\text{EQ-4}]$$

It may be obtained from the equations EQ-3 and EQ-4 that the voltage at A in the test mode is equal to the output voltage VOUT provided by the LDO regulator 12 in the normal mode. Assuming that the counter 1430 generates the signals (Q2, Q1, Q0)=(1, 1, 1) at beginning, the fuses F0, F1, and F3 are not blown out at this moment, so the switches MP0, MP1, and MP2 are turned on, and thereby the resistance $R_{eq}$ of the variable resistor 1444 is equal to {R3//R4//R5}. After the test signal is inputted, if the voltage at A is higher than the target voltage, the comparator 1406 generates a high-level comparison signal Scp, the AND gate 1424 generates a high-level signal Sc1, the latch 1426 maintains the signal Sc1 to generate a high-level signal Sc2, the AND gate 1428 generates the signal Sc3 based on the clock CLK and the signal Sc2, the counter 1430 generates the output signals (Q2, Q1, Q0)=(1, 1, 0) in response to the signal Sc3 to turn off the switch MP0, the resistance ($R_{eq}$=R4//R5) of the variable resistor 1444 increases, the current I will decrease according to the equation EQ-2, and thereby the voltage $V_A$ at A will decrease. If the decreased voltage $V_A$ is equal to the target voltage, the comparator 1406 generates a low-level comparison signal Scp, and the switch M0 is turned on to blow out the fuse F0 for maintaining the resistance $R_{eq}$ of the variable resistor 1444 at the value {R4//R5}. If the decreased voltage $V_A$ is still higher than the target voltage, the comparison signal Scp which is generated by the comparator 1406 still maintains the high level, the counter 1430 generates the signals (Q2, Q1, Q0)=(1, 0, 1) again to turn off the switch MP1 and turn on the switches MP0 and MP2, the resistance $R_{eq}$ of the variable resistor 1444 increases again, the voltage $V_A$ at A decreases again. Such steps repeat until the voltage $V_A$ at A is equal to the target voltage. In this embodiment, the resistance $R_{eq}$ of the variable resistor 1444 has eight selectable values. In other embodiments, the selectable values for the resistance $R_{eq}$ of the variable resistor 1444 are able to increase or decrease depending on the requirements, and if the selectable values for the resistance $R_{eq}$ of the variable resistor 1444 are more, the output voltage VOUT is able to be trimmed more precisely.

Figure 2:
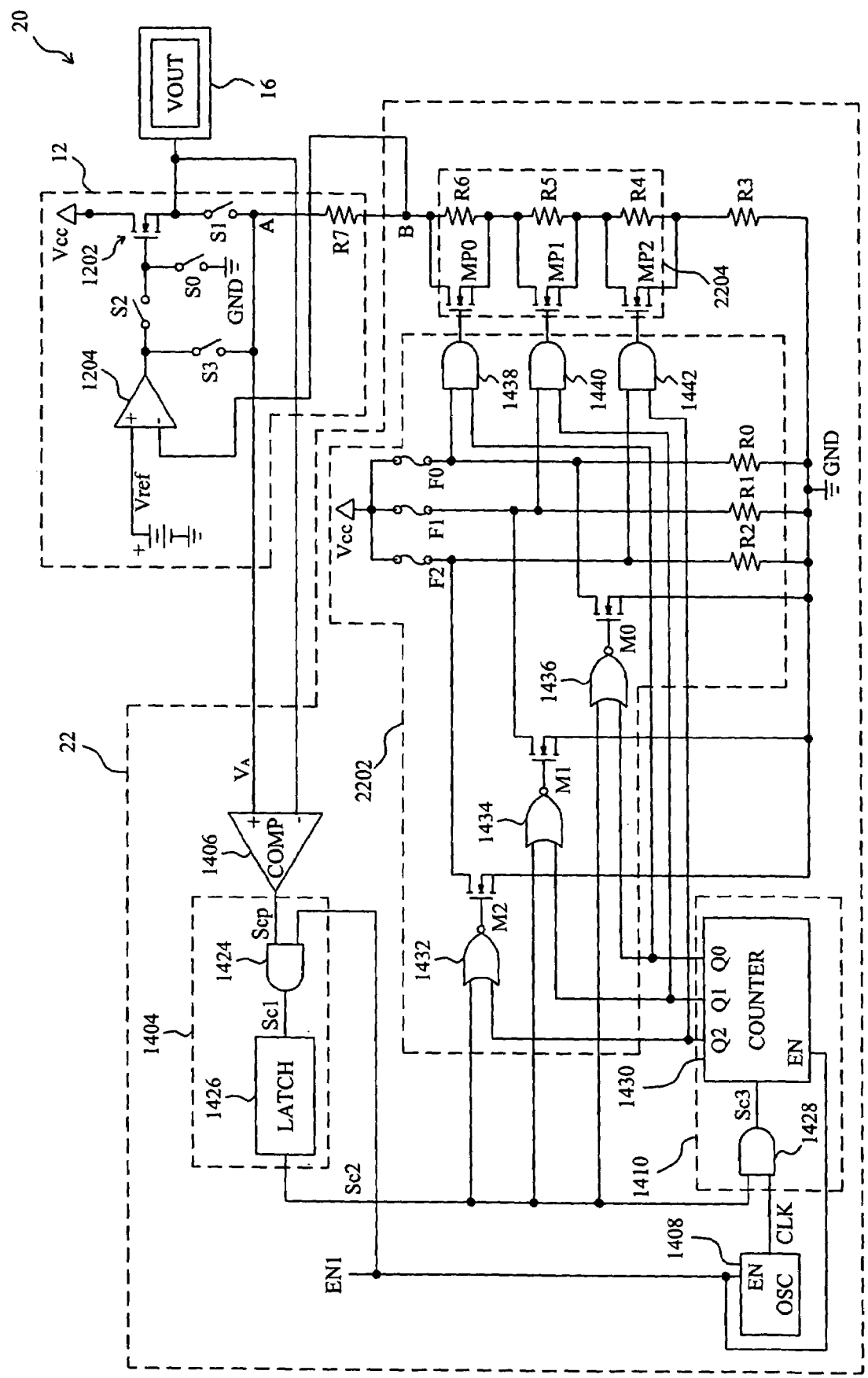
FIG. 2 shows a second embodiment of the present invention.

FIG. 2 shows a second embodiment of the present invention. In a power supply circuit 20, in addition to a trim circuit 22, an output pad 16, and an enable pad 18 (not shown, please refer to FIG. 1), it comprises a LDO regulator 12 including a transistor 1202, an error amplifier 1204, and switches S0, S1, S2, and S3. The trim circuit 22 includes an enable circuit 1402 (not shown, please refer to FIG. 1), a logic circuit 1404, a comparator 1406, an oscillator 1408, a logic circuit 1410, a control circuit 2202, and a variable resistor 2204. In a normal mode, an enable signal applied to the enable pad 18 signals the enable circuit 1402 to generate an enable signal EN1 to turn off the switches S0 and S3 and turn on the switches S1 and S2 for the LDO regulator 12 to generate an output voltage VOUT to the output pad 16, and it may be obtained from FIG. 2 that the current flowing through the transistor 1202 is $$I = \frac{VOUT}{R3 + R_{eq} + R7}, \quad [\text{EQ-5}]$$

where $R_{eq}$ is the resistance of the variable resistor 2204. Because of the virtual short between the two inputs of the error amplifier 1204, the voltage at the inverting input B is equal to the reference voltage Vref, and thereby the current is determined to be $$I = \frac{Vref}{R3 + R_{eq}}. \quad [\text{EQ-6}]$$

In a test mode, a target voltage and a test signal are applied to the output pad 16 and the enable pad 18, respectively, the test signal signals the enable circuit 1402 to generate the enable signal EN1 to turn on the switches S0 and S3 and turn off the switches S1 and S2, the target voltage is coupled to the inverting input of the comparator 1406. Since the switches S1 and S2 are off and the switch S3 is on, the inverting input B of the error amplifier 1204 is coupled to the output of the error amplifier 1204 through the variable resistor 2204, the resistor R7, and the switch S3. Because of the virtual, the voltage at the inverting input B is equal to the reference voltage Vref, and thereby the current I flowing through a resistor R3 is obtained as the equation EQ-6, and the voltage at A is $$V_A = I \times (R3 + R_{eq} + R7) = Vref + \frac{Vref \times R7}{R3 + R_{eq}}. \quad [\text{EQ-7}]$$

It is obtained from the equations EQ-5 and EQ-7 that the output voltage VOUT is equal to the voltage $V_A$ at A, and thereby adjusting the voltage $V_A$ in the test mode is equivalently adjusting the output voltage VOUT generated by the LDO regulator 12 in the normal mode. Assuming that the signals (Q2, Q1, Q0) are (1, 1, 1) at beginning, switches MP0, MP1, and MP2 are turned on, it is obtained from FIG. 2 that the resistance $R_{eq}$ of the variable resistor 2204 is zero at this moment, and the voltage $V_A$ is equal to $$Vref + \frac{Vref \times R7}{R3}.$$

The comparator 1406 compares the voltage $V_A$ with the target voltage from the output pad 16, and if the voltage $V_A$ is higher than the target voltage, the comparator 1406 will generate a high-level comparison signal Scp, the output signals (Q2, Q1, Q0) generated by the counter 1430 turn into (1, 1, 0) to turn off the switch MP0, the resistance $R_{eq}$ of the variable resistor 2204 is equal to R6, and the voltage $V_A$ decreases and equals $$Vref + \frac{Vref \times R7}{R3 + R6}.$$

If the decreased voltage $V_A$ is equal to the target voltage, the comparator 1406 generates a low-level comparison signal Scp, and the switch M0 is turned on to blow out a fuse F0. If the decreased voltage $V_A$ is still higher than the target voltage, the comparison signal Scp generated by the comparator 1406 still maintains the high level, the counter 1430 generates the signals (Q2, Q1, Q0)=(1, 0, 1) again to turn off the switch MP1 and turn on the switches MP0 and MP2, the resistance $R_{eq}$ of the variable resistor 2204 increases again to decrease the voltage $V_A$ at A. Such steps repeat until the voltage $V_A$ at A is equal to the target voltage. In this embodiment, the resistance $R_{eq}$ of the variable resistor 2204 has eight selectable values. In other embodiments, the selectable values for the resistance $R_{eq}$ of the variable resistor 2204 are able to increase or decrease depending on the requirements, and if the selectable values for the resistance $R_{eq}$ of the variable resistor 2204 are more, the output voltage VOUT is able to be trimmed more precisely.

Figure 3:
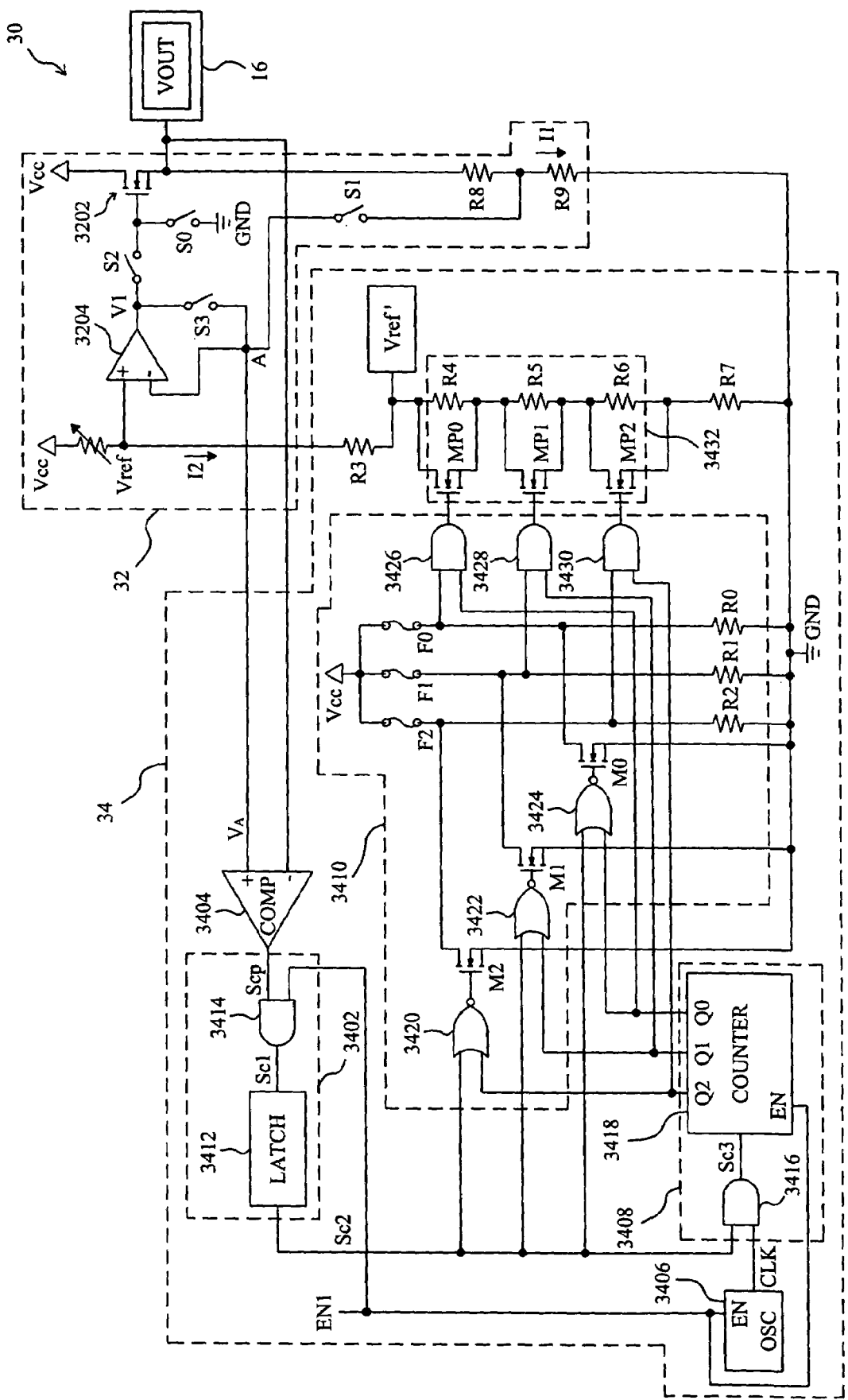
FIG. 3 shows a third embodiment of the present invention.

FIG. 3 shows a third embodiment of the present invention. A power supply circuit 30 comprises a LDO regulator 32 as a voltage regulator, a trim circuit 34, an output pad 16, and an enable pad 18 (not shown, please refer to FIG. 1). The LDO regulator 32 includes a transistor 3202 coupled between a power source Vcc and the output pad 16, a switch S0 is coupled between the gate of the transistor 3202 and ground GND, one end of a switch S1 is coupled between resistors R8 and R9, the other end of the switch S1 is coupled to an inverting input of an error amplifier 3204, a non-inverting input of the error amplifier 3204 is coupled with a reference voltage Vref, and the error amplifier 3204 generates a voltage V1 in response to its two inputs to couple to the gate of the transistor 3202 and the trim circuit 34 by switches S2 and S3, respectively. In the trim circuit 34, an enable circuit 1402 (not shown, please refer to FIG. 1) generates an enable signal EN1 based on the signal from the enable pad 18, a comparator 3404 compares its two inputs to generate a comparison signal Scp, a logic circuit 3402 includes a latch 3412 and a AND gate 3414, the AND gate 3414 generates a signal Sc1 in response to the comparison signal Scp and the enable signal EN1, the latch 3412 generates a signal Sc2 in response to the signal Sc1, an oscillator 3406 is enabled by the enable signal EN1 to generate a clock CLK for a logic circuit 3408 to generate signals Q0, Q1, and Q2, the logic circuit 3408 includes a AND gate 3416 and a counter 3418, the AND gate 3416 generates a signal Sc3 in response to the signal Sc2 and the clock CLK, the counter 3418 is enabled to generate the signals Q0, Q1, and Q3 based on the signal Sc3, a variable resistor 3432 is coupled to the LDO regulator 32, and a control circuit 3410 adjusts the variable resistor 3432 based on the signals Sc2 and Sc3 to trim the output voltage VOUT. In the control circuit 3410, NOR gates 3420, 3422, and 3424 control switches M2, M1, and M0 in response to the signals Sc2 and Sc3, and each of the switches M0, M1, and M2 corresponds to one of fuses F0, F1, and F2. When the switch M0, M1, or M2 is turned on, the corresponding fuse F0, F1, or F2 will be blown out such that the voltage across resistor R0, R1, or R2 is zero, and AND gates 3426, 3428, and 3430 control switches MP0, MP1, and MP2 based on the voltage across the resistor R0, R1, or R2 and the signals Q0, Q1, and Q2 to determine the resistance of the variable resistor 3432.

In a normal mode, the enable signal from the enable pad 18 signals the enable circuit 1402 (not shown, please refer to FIG. 1) to generate a low-level enable signal EN1, by which the switches S0 and S3 are turned off, the switches S1 and S2 are turned on, the oscillator 3406 and the counter 3418 are turned off, and thereby the trim circuit 34 does not perform trim function, the error amplifier 3204 generates a voltage V1 in response to its two inputs to control the channel size of the transistor 3202 by the switch S2 to generate the output voltage VOUT to the output pad 16, and the output voltage VOUT is divided by resistors R8 and R9 to feed back to the inverting input of the error amplifier 3204 to regulate the output voltage VOUT at a target value. According to the LDO regulator 32 shown in FIG. 3, it may be obtained the output voltage $$VOUT = I1 \times (R8 + R9), \quad [\text{EQ-8}]$$

where I1 is the current flowing through the resistors R8 and R9. Because of the virtual short between the two inputs of the error amplifier 3204, the current is also determined to be $$I1 = \frac{Vref}{R9}. \quad [\text{EQ-9}]$$

In a test mode, the test signal applied to the enable pad 18 signals the enable circuit 1402 (not shown, please refer to FIG. 1) to generate a high-level enable signal EN1, by which the switches S0 and S3 are turned on, the switches S1 and S2 are turned off, and the oscillator 3406 and the counter 3418 are enabled to activate the trim circuit 34 to perform trim function. When the test signal is applied to the enable pad 18, a target voltage is also applied to the output 16. Since the switch S0 is on and the switch S1 is off, the target voltage is coupled to the inverting input of the comparator 3404 from the output pad 16. The switches S1 and S2 are off, the switch S3 is on, and the two inputs of the error amplifier 3204 are virtually short, and thereby the voltage at the non-inverting input A is $$V_A = Vref = I2 \times (R3 + R_{eq} + R7), \quad [\text{EQ-10}]$$

where $R_{eq}$ is the resistance of the variable resistor 3432. Further, $$I2 = \frac{Vref'}{R_{eq} + R7}, \quad [\text{EQ-11}]$$

where Vref' is the reference voltage generated by an internal circuit. According to the equation EQ-11, the equation EQ-10 may be rewritten as $$V_A = Vref = Vref' + \frac{Vref' \times R3}{R_{eq} + R7}. \qquad [\text{EQ-12}]$$

Assuming that the counter 3418 generates signals (Q2, Q1, Q0)=(1, 1, 1) at beginning, switches MP0, MP1, and MP2 are turned on at this moment, so the resistance $R_{eq}$ of the variable resistor 3432 is zero. If the voltage $V_A$ at A is higher than the target voltage, the comparator 3404 generates a high-level comparison signal Scp for the AND gate 3414 to generate a high-level signal Sc1, the latch 3412 maintains the high-level signal Sc1 to generate a high-level signal Sc2, the AND gate 3416 generates a signal Sc3 based on the clock CLK and the signal Sc2, the counter 3418 generates output signals (Q2, Q1, Q0)=(1, 1, 0) in response to the signal Sc3 to turn off the switch MP0, so the resistance $R_{eq}$ of the variable resistor 3432 increases and equals R4, and the voltage $V_A$ at A will decrease according to the equation EQ-12. If the decreased voltage $V_A$ is equal to the target voltage, the comparator 3404 generates a low-level comparison signal Scp, and the switch MP0 is turned on to blow out the fuse R4. If the decreased voltage $V_A$ is still higher than the target voltage, the comparison signal Scp generated by the comparator 3404 still maintains the high level, the counter 3418 generates signals (Q2, Q1, Q0)=(1, 0, 1) again to turn off the switch MP1 and turn on the switches MP0 and MP2, the resistance $R_{eq}$ of the variable resistor 3432 increases again to decrease the voltage $V_A$ at A. Such steps repeat until the voltage $V_A$ at A is equal to the target voltage. In this embodiment, the resistance $R_{eq}$ of the variable resistor 3432 has eight selectable values. In other embodiments, the selectable values for the resistance $R_{eq}$ of the variable resistor 3432 are able to increase or decrease depending on the requirements, and if the selectable values for the resistance $R_{eq}$ of the variable resistor 3432 are more, the voltage Vref is able to be trimmed more precisely and to further trim the output voltage VOUT more precisely.

Figure 4:
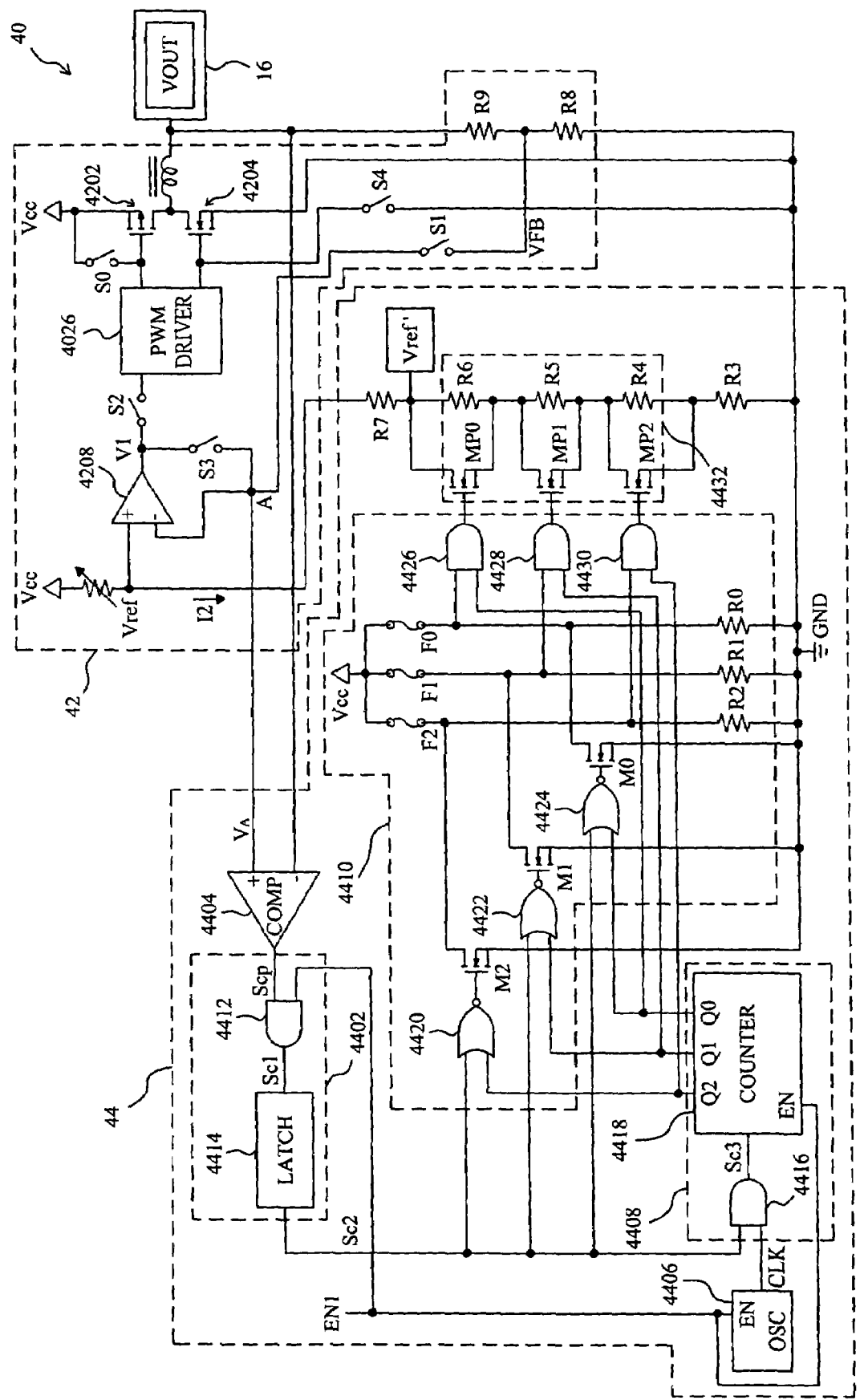
FIG. 4 shows a fourth embodiment of the present invention.

FIG. 4 shows a fourth embodiment of the present invention. A power supply circuit 40 comprises a DC-to-DC converter 42 as a voltage regulator, a trim circuit 44, an output pad 16, and an enable pad 18 (not shown, please refer to FIG. 1). The DC-to-DC converter 42 includes a pair of transistors 4202 and 4204 as switches coupled in series between a power source Vcc and ground GND, a non-inverting input of an error amplifier 4208 is coupled with a reference voltage Vref, an inverting input of the error amplifier 4208 is coupled to the output pad 16 by a switch S1 and a resistor R9, the error amplifier 4208 generates a voltage V1 in response to its two inputs to couple to a PWM driver 4206 and the trim circuit 44 by switches S2 and S3, respectively, the driver 4206 switches the transistors 4202 and 4204 based on the voltage V1, the gate of the transistor 4202 is coupled to the power source Vcc by a switch S0, and the gate of the transistor 4204 is coupled to ground GND by a switch S4. The trim circuit 44 includes an enable circuit 1402 (not shown, please refer to FIG. 1), logic circuits 4402 and 4408, a comparator 4404, an oscillator 4406, a control circuit 4410, and a variable resistor 4432.

In a normal mode, the switches S0, S3, and S4 in the DC-to-DC converter 42 turn off, the switches S1 and S2 turn on, and the error amplifier 4208 compares the reference voltage Vref with a feedback voltage VFB to generate the voltage V1 for the PWM driver 4206 to switch the transistors 4202 and 4204 to convert the supply voltage Vcc to the output voltage VOUT. In a test mode, the switches S0, S3, and S4 in the DC-to-DC converter 42 turn on, the switches S1 and S2 turn off, a test signal applied to the enable pad 18 signals the enable circuit 1402 to generate a high-level enable signal EN1, and a target voltage is coupled to the inverting input of the comparator 4404 from the output pad 16. Because of virtual short, the voltage $V_A$ at the non-inverting input of the comparator 4404 is equal to the reference voltage Vref, and the comparator 4404 compares the voltage $V_A$ with the target voltage to generate a comparison signal Scp. A AND gate 4412 in the logic circuit 4402 generates a signal Sc1 in response to the comparison signal Scp and the enable signal EN1 for the latch 4414 to generate a signal Sc2, the oscillator 4406 is enabled to generate a clock CLK, a AND gate 4416 in the logic circuit 4418 generates a signal Sc3 based on the signal Sc2 and the clock CLK, and the counter 4418 generates signals (Q2, Q1, Q0) in response to the signal Sc3 and the clock CLK. Assuming that the signals (Q2, Q1, Q0) are (1, 1, 1) at beginning, so NOR gates 4420, 4422, and 4424 in the control circuit 4410 all generate low-level signals to turn off the switches M0, M1, and M2, and AND gates 4426, 4428, and 4430 all generate high-level signals to turn on the switches MP0, MP1, and MP2 in the variable resistor 4432. If the reference voltage Vref is higher than the target voltage, the signal Sc2 has high level to further change the signals (Q2, Q1, Q0) to (1, 1, 0), the switch MP0 is turned off at this moment, and the resistance $R_{eq}$ of the resistor 4432 increases and equals R6 to decrease the reference voltage Vref. If the decreased reference voltage Vref is still higher than the target voltage, the signals (Q2, Q1, Q0) change to (1, 0, 1) again to turn off the switch MP1 and turn on the switches MP0 and MP2. Such steps repeat until the reference voltage Vref is equal to the target voltage. It may be obtained from FIG. 4 that the output voltage VOUT will be regulated with the reference voltage Vref, and thereby the output voltage VOUT is trimmed by adjusting the reference voltage Vref.

Figure 5:
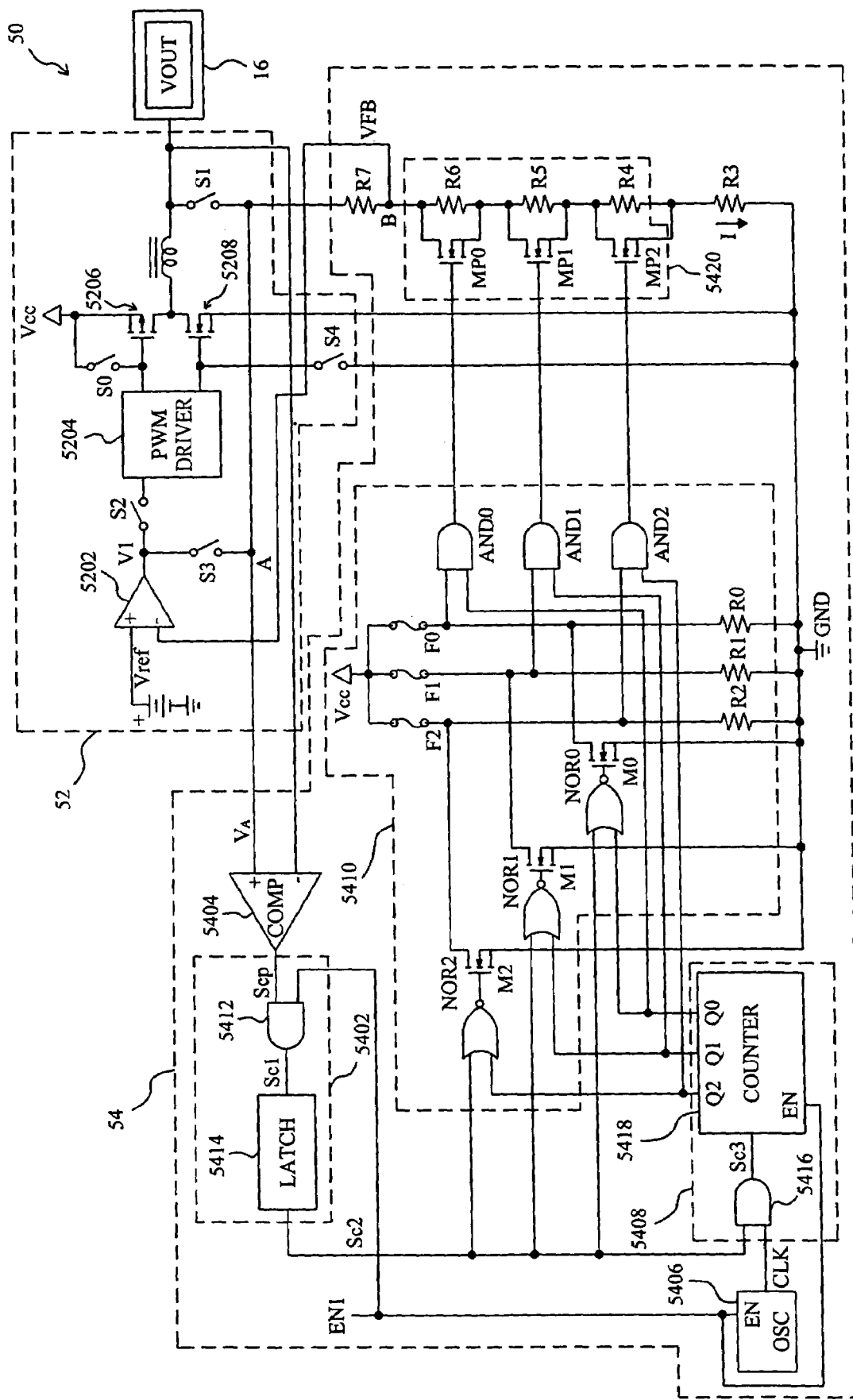
FIG. 5 shows a fifth embodiment of the present invention.

FIG. 5 shows a fifth embodiment of the present invention. A power supply circuit 50 comprises a DC-to-DC converter 52 as a voltage regulator, a trim circuit 54, an output pad 16, and an enable pad 18 (not shown, please refer to FIG. 1). The DC-to-DC converter 52 includes a pair of transistors 5206 and 5208 as switches coupled in series between a power source Vcc and ground GND, a non-inverting input of an error amplifier 5202 is coupled with a reference voltage Vref, an inverting input of the error amplifier 5202 is coupled to the output pad 16 by a resistor R7 and a switch S1, the error amplifier 5202 generates a voltage V1 in response to its two inputs to couple to a PWM driver 5204 and the trim circuit 54 by switches S2 and S3, respectively, the driver 5204 switches the transistors 5206 and 5208 based on the voltage V1, the gate of the transistor 5206 is coupled to the power source Vcc by a switch S0, and the gate of the transistor 5208 is coupled to ground GND by a switch S4. The trim circuit 54 includes an enable circuit 1402 (not shown, please refer to FIG. 1), logic circuits 5402 and 5408, a comparator 5404, an oscillator 5406, a control circuit 5410, and a variable resistor 5420.

In a normal mode, the switches S0, S3, and S4 in the DC-to-DC converter 52 turn off, the switches S1 and S2 turn on, and the output voltage VOUT is divided by resistors R7 and R3 and the variable resistor 5420 to generate a feedback voltage $$VFB = \frac{R3 + R_{eq}}{R3 + R_{eq} + R7} \times VOUT, \qquad [\text{EQ-13}]$$

where $R_{eq}$ is the resistance of the variable resistor 5420. The error amplifier 5202 generates a voltage V1 in response to a reference voltage Vref and the feedback voltage VFB for the PWM driver 5204 to switch the transistors 5206 and 5208 to generate the output voltage VOUT.

In a test mode, the switches S0, S3, and S4 in the DC-to-DC converter 52 turn on, the switches S1 and S2 turn off, a target voltage is applied to the inverting input of the comparator 5404 from the output pad 16, and a test signal applied to the enable pad 18 signals the enable circuit 1402 (not shown, please refer to FIG. 1) to generate an enable signal EN1 to enable the oscillator 5406 and the counter 5418. Because of virtual short, the voltage VFB at the feedback terminal B is equal to the reference voltage Vref, and thereby the current flowing through the resistor R3 and the variable resistor 5420 is $$I = \frac{Vref}{R3 + R_{eq}}. \quad [\text{EQ-14}]$$

Hence the voltage at the non-inverting input A is $$VA = V1 = I \times R7 + Vref. \quad [\text{EQ-15}]$$

The comparator 5404 compares the voltage $V_A$ with the target voltage to generate a comparison signal Scp, a AND gate 5412 in the logic circuit 5402 generates a signal Sc1 in response to the comparison signal Scp and the enable signal EN1 for the latch 5414 to generate a signal Sc2, a AND gate 5416 in the logic circuit 5408 generates a signal Sc3 based on the signal Sc2 and a clock CLK generated by the oscillator 5406, and the counter 5418 generates signals (Q2, Q1, Q0) in response to the signal Sc3 for the control circuit 5410 to adjust the variable resistor 5420. It may be obtained from the equations EQ-14 and EQ-15 that the voltage $V_A$ will vary with the resistance $R_{eq}$ of the variable resistor 5420. When the voltage $V_A$ reaches the target voltage, the control circuit 5410 blows out fuses F0, F1, or F2 in response to the signals (Q2, Q1, Q0) to maintain the resistance $R_{eq}$ of the variable resistor 5420. Besides, it may be obtained from the equation EQ-13 that the feedback voltage VFB will be maintained because of virtual short, so the output voltage VOUT is trimmed with the resistance $R_{eq}$ of the variable resistor 5420, and thereby the output voltage VOUT is trimmed by adjusting the variable resistor 5420.

Figure 6:
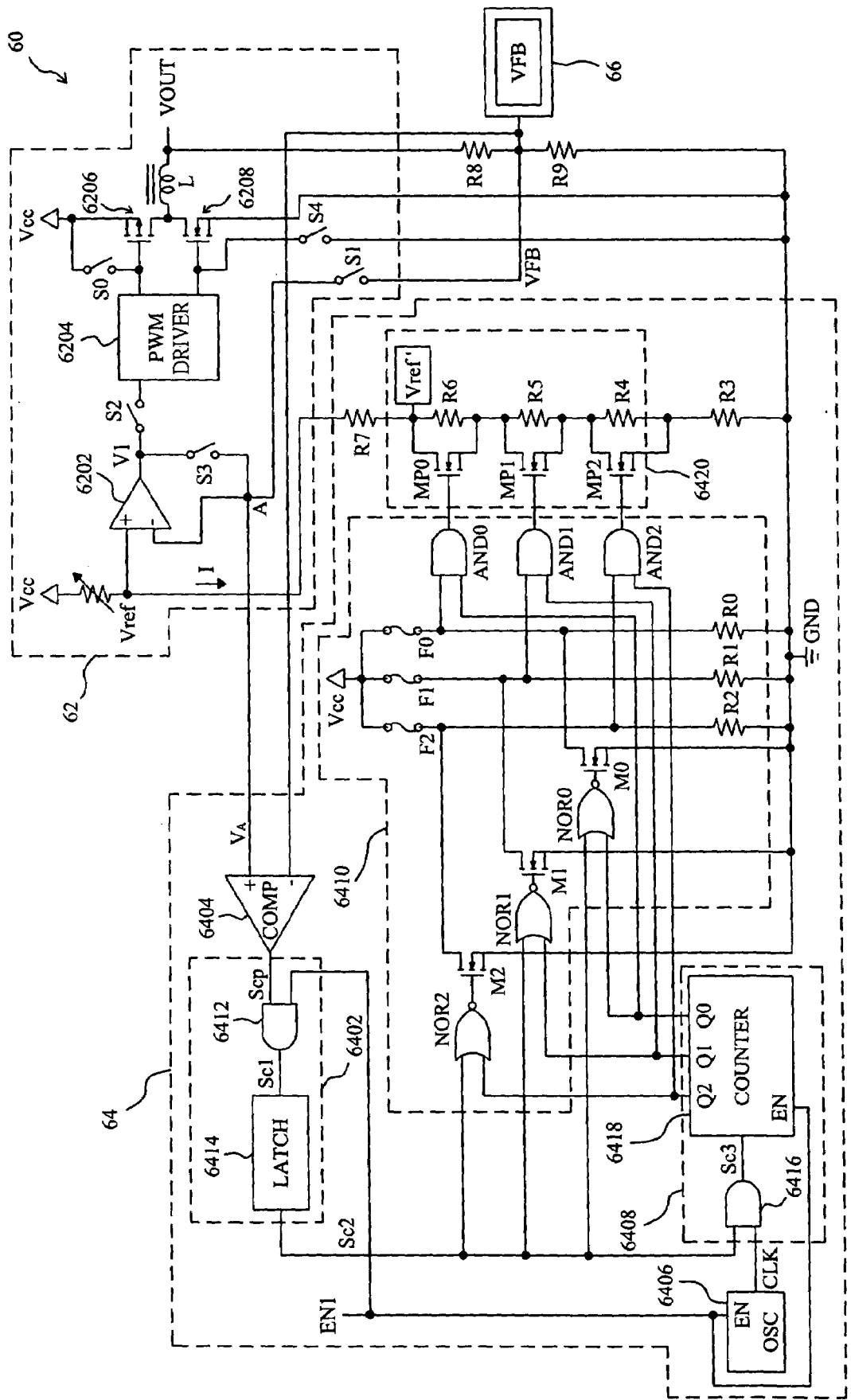
FIG. 6 shows a sixth embodiment of the present invention.

FIG. 6 shows a sixth embodiment of the present invention. A power supply circuit 60 comprises a DC-to-DC converter 62 as a voltage regulator, a trim circuit 64, a feedback pad 66, and an enable pad 18 (not shown, please refer to FIG. 1). The DC-to-DC converter 62 includes a pair of transistors 6206 and 6208 as switches coupled in series between a power source Vcc and ground GND, a non-inverting input of an error amplifier 6202 is coupled with a reference voltage Vref, an inverting input of the error amplifier 6202 is coupled to the feedback pad 66 by a switch S1, the error amplifier 6202 generates a voltage V1 in response to its two inputs to couple to a PWM driver 6204 and the trim circuit 64 by switches S2 and S3, respectively, the PWM driver 6204 switches the transistors 6206 and 6208 based on the voltage V1, the gate of the transistor 6206 is coupled to the power source Vcc by a switch S0, and the gate of the transistor 6208 is coupled to ground GND by a switch S4. The trim circuit 64 includes an enable circuit 1402 (not shown, please refer to FIG. 1), logic circuits 6402 and 6408, a comparator 6404, an oscillator 6406, a control circuit 6410, and a variable resistor 6420. In this embodiment, the variable resistor 6420 includes resistors R4, R5, and R6 coupled in series, and each of the resistors R4, R5, and R6 parallel coupled to one of switches MP2, MP1, and MP0. In other embodiments, the resistors R4, R5, and R6 may couple in parallel, and each of the resistors R4, R5, and R6 serially coupled to one of the switches MP2, MP1, and MP0.

In a normal mode, the switches S0, S3, and S4 in the DC-to-DC converter 62 turn off, the switches S1 and S2 turn on, the output voltage VOUT is divided by resistors R8 and R9 to generate a feedback voltage VFB, and the error amplifier 6202 generates a voltage V1 in response to the reference voltage Vref and the feedback voltage VFB for the PWM driver 6204 to switch the transistors 6206 and 6208 to generate the output voltage VOUT. Because of virtual short, it may be obtained the feedback voltage $$VFB = Vref = \frac{R9}{R8 + R9} \times VOUT, \quad [\text{EQ-16}]$$

and the reference voltage $$Vref = I \times (R_{eq} + R3 + R7), \quad [\text{EQ-17}]$$

where $R_{eq}$ is the resistance of the variable resistor 6420. Besides, $$I = \frac{Vref'}{R_{eq} + R3}, \quad [\text{EQ-18}]$$

where Vref' is the Reference voltage generated by an internal circuit. According to the equation EQ-18, the equation EQ-17 may be rewritten as $$Vref = Vref' + \frac{Vref' \times R7}{R_{eq} + R3}. \quad [\text{EQ-19}]$$

In a test mode, the switches S0, S3, and S4 in the DC-to-DC converter 62 turn on, the switches S1 and S2 turn off, a test signal applied to the enable pad 18 signals the enable circuit 1402 (not shown, please refer to FIG. 1) to generate an enable signal EN1 to enable the oscillator 6406 and the counter 6418, a target voltage is applied to the inverting input of the comparator 6404 from the feedback pad 66. Because of virtual short, the voltage $V_A$ at the non-inverting input A of the comparator 6404 is equal to the voltage V1 and the reference voltage Vref, the comparator 6404 compares the voltage $V_A$ with the target voltage to generate a comparison signal Scp, a AND gate 6412 in the logic circuit 6402 generates a signal Sc1 in response to the comparison signal Scp and the enable signal EN1 for the latch 6414 to generate a signal Sc2, a AND gate 6416 in the logic circuit 6408 generates a signal Sc3 based on the signal Sc2 and a clock CLK generated by the oscillator 6406, and the counter 6418 generates signals (Q2, Q1, Q0) in response to the signal Sc3 for the control circuit 6410 to adjust the variable resistor 6420. From the equation EQ-19, it may be obtained that the reference voltage Vref will vary with the resistance $R_{eq}$ of the variable resistor 6420, so the voltage $V_A$ at A will also vary with the resistance $R_{eq}$ of the variable resistor 6420. When the voltage $V_A$ reaches the target voltage, the control circuit 6410 blows out fuses F0, F1, or F2 in response to the signals (Q2, Q1, Q0) to maintain the resistance $R_{eq}$ of the variable resistor 6420. Since the resistors R8 and R9 are constant, it may be obtained from the equation EQ-16 that the output voltage VOUT is trimmed with the reference voltage Vref, and thereby the output voltage VOUT is trimmed by adjusting the variable resistor 6420.

Figure 7:
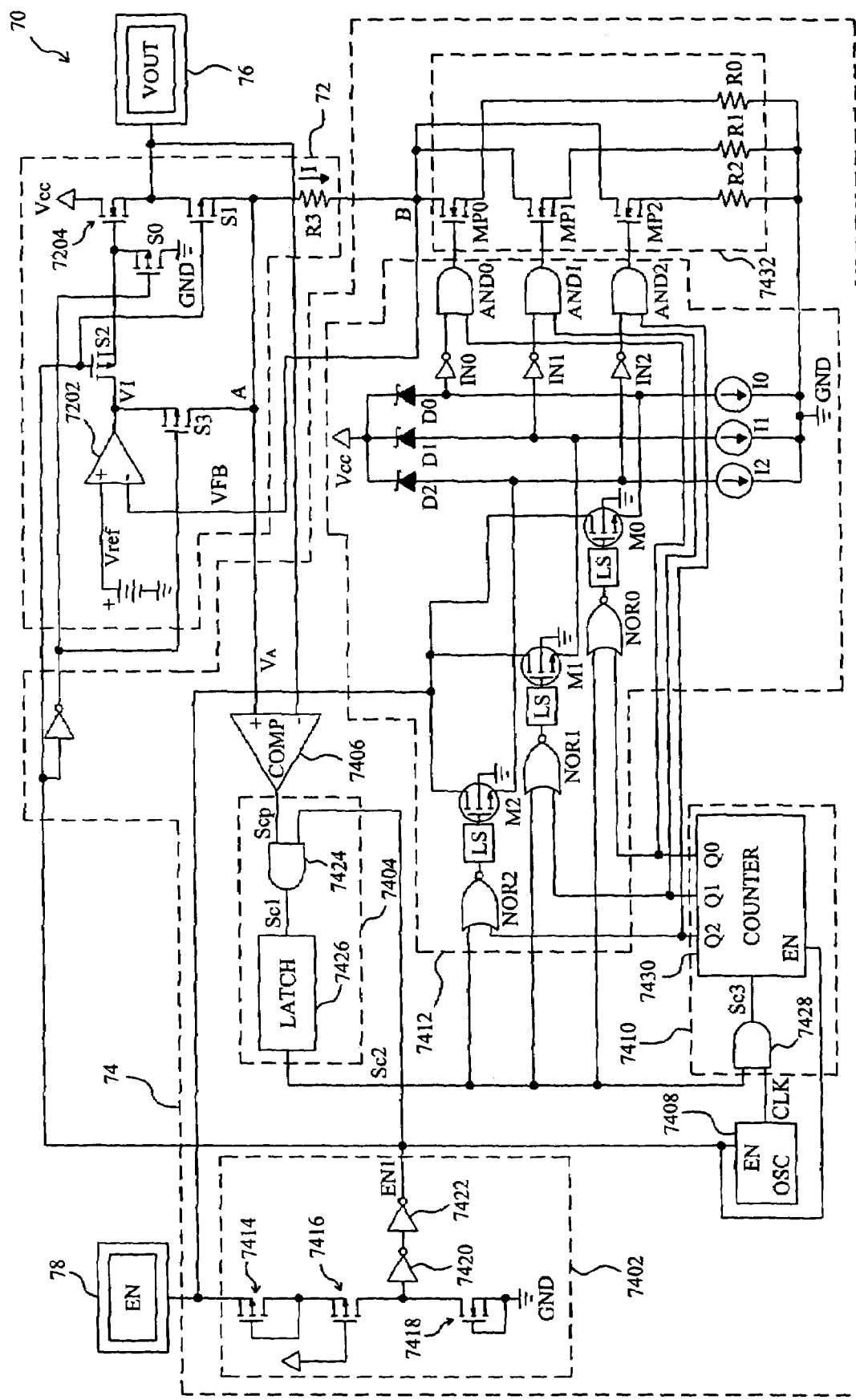
FIG. 7 shows a seventh embodiment of the present invention.

FIG. 7 shows a seventh embodiment of the present invention. A power supply circuit 70 comprises a LDO regulator 72 as a voltage regulator, a trim circuit 74, an output pad 76, and an enable pad 78. In the LDO regulator 72, a non-inverting input of an error amplifier 7202 is coupled with a reference voltage Vref, an inverting input of the error amplifier 7202 is coupled to the output pad 76 by a resistor R3 and a switch S1, the error amplifier 7202 generates a voltage V1 in response to its two inputs to couple to the gate of a transistor 7204 and the trim circuit 74 by switches S2 and S3, respectively, and the transistor 7204 coupled between a power source Vcc and the output pad 76 has a gate coupled to ground GND by a switch S0. The trim circuit 74 includes an enable circuit 7402, logic circuits 7404 and 7410, a comparator 7406, an oscillator 7408, a control circuit 7412, and a variable resistor 7432. Diodes D0, D1, and D2 in the control circuit 7412 are Zener diodes. The enable circuit 7402 includes transistors 7414, 7416, and 7418 coupled in series between the enable pad 78 and ground GND, in which the transistor 7418 is a depletion mode transistor, and a pair of inverters 7420 and 7422 coupled in series between the drain of the transistor 7418 and an enable signal EN1.

In a normal mode, an enable signal applied to the enable pad 78 signals the enable circuit 7402 to generate a low-level enable signal EN1, by which switches S0 and S3 in the LDO regulator 72 are turned off, and the switches S1 and S2 are turned on, the output voltage VOUT is divided by a resistor R3 and a variable resistor 7432 in the trim circuit 74 to generate a feedback voltage VFB, and the error amplifier generates a voltage V17202 in response to the reference voltage Vref and the feedback voltage VFB to control the channel size of the transistor 7204 to generate the output voltage VOUT. Because of virtual short, the feedback voltage VFB is equal to the reference voltage Vref, so the current flowing through the transistor 7204 is $$I = \frac{Vref}{R_{eq}}, \quad [\text{EQ-20}]$$

where $R_{eq}$ is the resistance value of the variable resistor 7432. Hence the output voltage is $$VOUT = I \times (R3 + R_{eq}). \quad [\text{EQ-21}]$$

In a test mode, a target voltage and a test signal are applied to the output pad 76 and the enable pad 78, respectively. The test signal signals the enable circuit 7402 to generate a high-level enable signal EN1, by which the switches S0 and S3 in the LDO regulator 72 are turned on, the switches S1 and S2 are turned off, and the oscillator 7408 and a counter 7430 are enabled, and the target voltage is coupled to the inverting input of the comparator 7406 in the trim circuit 74. Because of virtual short, the voltage at the inverting input B of the error amplifier 7202 is equal to the reference voltage Vref, the current I flowing through the resistor R3 and the variable resistor 7432 is obtained as the equation EQ-20, and thereby the voltage at the non-inverting input A of the comparator 7406 is $$V_A = I \times (R3 + R_{eq}). \quad [\text{EQ-22}]$$

The comparator 7406 compares the target voltage with the voltage $V_A$ to generate a comparison signal Scp, a AND gate 7424 in the logic circuit 7404 generates a signal Sc1 in response to the comparison signal Scp and the enable signal EN1 for a latch 7426 to generate a signal Sc2, the oscillator 7408 is enabled by the enable signal EN1 to provide a clock CLK, and a AND gate 7428 in the logic circuit 7410 generates a signal Sc3 in response to the signal Sc2 and the clock CLK for the counter 7430 to generate signals (Q2, Q1, Q0) for the control circuit 7412 to adjust the variable resistor 7432. After the voltage $V_A$ reaches the target voltage, the comparator 7406 generates a low-level signal Scp, and the latch 7426 generates a low-level signal Sc2. When the signal Q0, Q1, or Q2 is zero, NOR gate NOR0, NOR1, or NOR2 generates a high-level signal, and level shift circuit LS corresponding to the NOR gates NOR0, NOR1, or NOR2 generates a voltage higher than the supply voltage Vcc to short the diode D0, D1, or D2 by blowing out the diode D0, D1, or D2 to maintain the resistance $R_{eq}$ of the variable resistor 7432. According to the equation EQ-21, the resistance $R_{eq}$ of the variable resistor 7432 will influence the output voltage VOUT, and thereby the output voltage VOUT is trimmed.

Figure 8:
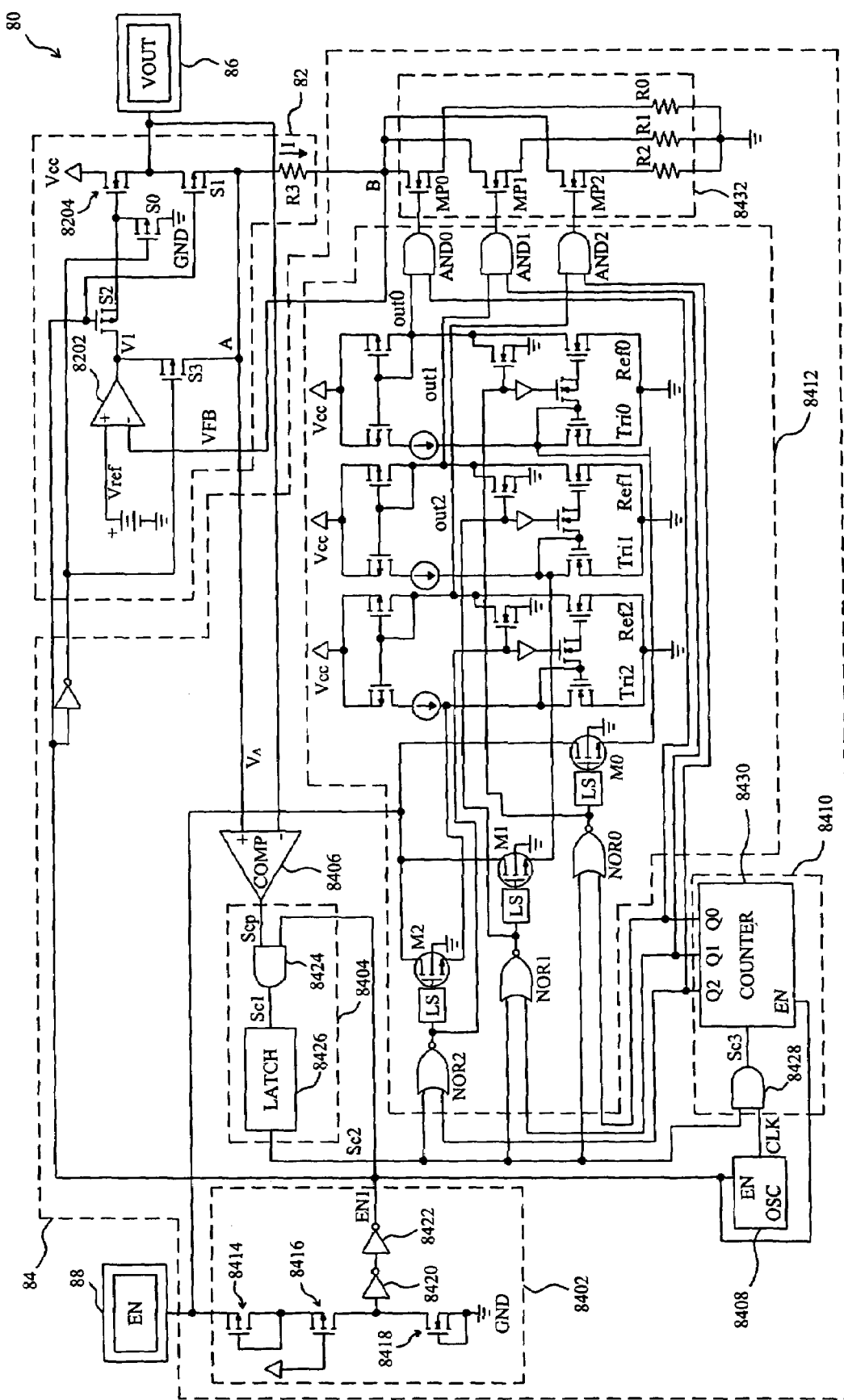
FIG. 8 shows an eighth embodiment of the present invention.

FIG. 8 shows an eighth embodiment of the present invention. A power supply circuit 80 comprises a LDO regulator 82 as a voltage regulator, a trim circuit 84, an output pad 86, and an enable pad 88. In the LDO regulator 82, the non-inverting input of an error amplifier 8202 is coupled with a reference voltage Vref, the inverting input of the error amplifier 8202 is coupled to the output pad 86 by a resistor R3 and a switch S1, the error amplifier 8202 generates a voltage V1 in response to its two inputs to couple to the gate of a transistor 8204 and the trim circuit 84 by switches S2 and S3, respectively, and the transistor 8204 coupled between a power source Vcc and the output pad 86 has a gate coupled to ground GND by a switch S0. The trim circuit 84 includes an enable circuit 8402, logic circuits 8404 and 8410, a comparator 8406, an oscillator 8408, a control circuit 8412, and a variable resistor 8432. Transistors Tri0, Tri1, Tri2, Ref0, Ref1, and Ref2 are the elements of an erasable programmable read only memory (EPROM) in the control circuit 8412. The enable circuit 8402 includes transistors 8414, 8416, and 8418 coupled in series between the enable pad 88 and ground GND, in which the transistor 8418 is a depletion mode transistor, and a pair of inverters 8420 and 8422 coupled in series between the drain of the transistor 8418 and an enable signal EN1.

In a normal mode, an enable signal applied to the enable pad 88 signals the enable circuit 8402 to generate a low-level enable signal EN1, by which switches S0 and S3 in the LDO regulator 82 are turned off, and the switches S1 and S2 are turned on, the output voltage VOUT is divided by a resistor R3 and a variable resistor 8432 in the trim circuit 84 to generate a feedback voltage VFB, and the error amplifier 8202 generates a voltage V1 in response to the reference voltage Vref and the feedback voltage VFB to control the channel size of the transistor 8204 to generate the output voltage VOUT. Because of virtual short, the feedback voltage VFB is equal to the reference voltage Vref, so the current flowing through the resistor R3 is $$I = \frac{Vref}{R_{eq}}, \quad [\text{EQ-23}]$$

where $R_{eq}$ is the resistance of the variable resistor 8432. Hence the output voltage is $$VOUT = I \times (R3 + R_{eq}). \quad [\text{EQ-24}]$$

In a test mode, a target voltage and a test signal are applied to the output pad 86 and the enable pad 88, respectively. The test signal signals the enable circuit 8402 to generate a high-level enable signal EN1, by which the switches S0 and S3 in the LDO regulator 82 are turned on, the switches S1 and S2 are turned off, and the oscillator 8408 and a counter 8430 are enabled, and the target voltage is coupled to the inverting input of the comparator 8406 in the trim circuit 84. Because of virtual short, the voltage at the inverting input B of the error amplifier 8202 is equal to the reference voltage Vref, the current I flowing through the resistor R3 and the variable resistor 8432 is obtained as the equation EQ-23, and thereby the voltage at the non-inverting input A of the comparator 8406 is $$VA = I \times (R3 + R_{eq}) \quad [EQ-25]$$

The comparator 8406 compares the target voltage with the voltage $V_A$ to generate a comparison signal Scp, a AND gate 8424 in the logic circuit 8404 generates a signal Sc1 in response to the comparison signal Scp and the enable signal EN1 for a latch 8426 to generate a signal Sc2, the oscillator 8408 is enabled by the enable signal EN1 to provide a clock CLK, and a AND gate 8428 in the logic circuit 8410 generates a signal Sc3 in response to the signal Sc2 and the clock CLK for the counter 8430 to generate signals (Q2, Q1, Q0) for the control circuit 8412 to adjust the variable resistor 8432. After the voltage $V_A$ reaches the target voltage, the comparator 8406 generates a low-level signal Scp, and the latch 8426 generates a low-level signal Sc2. When the signal Q0, Q1, or Q2 is zero, NOR gate NOR0, NOR1, or NOR2 corresponding to the signal Q0, Q1, or Q2 generates a high-level signal, level shift circuit LS generates a voltage higher than the supply voltage Vcc, the transistor Tri0, Tri1, or Tri2 corresponding to the level shift circuit LS is programmed to higher VT level, and signal OUT0, OUT1, or OUT2 is low-level to turn off switch MP0, MP1, or MP2 to maintain the resistance $R_{eq}$ of the variable resistor 8432. According to the equation EQ-24, the resistance $R_{eq}$ of the variable resistor 8432 will influence the output voltage VOUT, and thereby the output voltage VOUT is trimmed.

Figure 9:
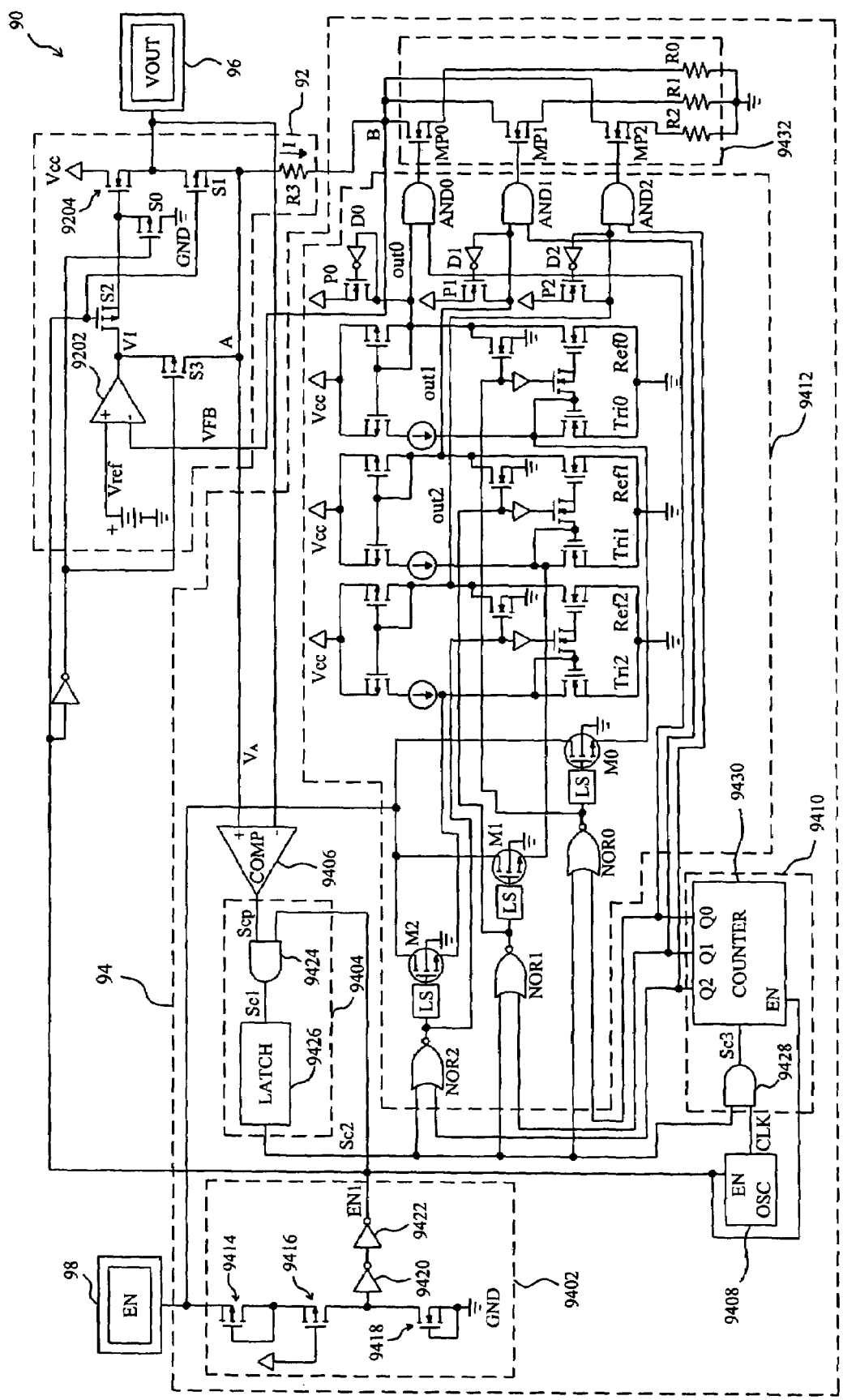
FIG. 9 shows a ninth embodiment of the present invention.

FIG. 9 shows a ninth embodiment of the present invention. A power supply circuit 90 comprises a LDO regulator 92 as a voltage regulator, a trim circuit 94, an output pad 96, and an enable pad 98. In the LDO regulator 92, the non-inverting input of an error amplifier 9202 is coupled with a reference voltage Vref, the inverting input of the error amplifier 9202 is coupled to the output pad 96 by a resistor R3 and a switch S11, the error amplifier 9202 generates a voltage V1 in response to its two inputs to couple to the gate of a transistor 9204 and the trim circuit 94 by switches S2 and S3, respectively, and the transistor 9204 coupled between a power source Vcc and the output pad 96 has a gate coupled to ground GND by a switch S0. The trim circuit 94 includes an enable circuit 9402, logic circuits 9404 and 9410, a comparator 9406, an oscillator 9408, a control circuit 9412, and a variable resistor 9432. The enable circuit 9402 includes transistors 9414, 9416, and 9418 coupled in series between the enable pad 98 and ground GND, in which the transistor 9418 is a depletion mode transistor, and a pair of inverters 9420 and 9422 are coupled in series between the drain of the transistor 9418 and an enable signal EN1.

In a normal mode, an enable signal applied to the enable pad 98 signals the enable circuit 9402 to generate a low-level enable signal EN1, by which switches S0 and S3 in the LDO regulator 92 are turned off, and the switches S1 and S2 are turned on, the output voltage VOUT is divided by a resistor R3 and a variable resistor 9432 in the trim circuit 94 to generate a feedback voltage VFB, and the error amplifier 9202 generates a voltage V1 in response to the reference voltage Vref and the feedback voltage VFB to control the channel size of the transistor 9204 to generate the output voltage VOUT. Because of virtual short, the feedback voltage VFB is equal to the reference voltage Vref, so the current flowing through the resistor R3 is $$I = \frac{Vref}{R_{eq}}, \quad [EQ-26]$$

where $R_{eq}$ is the resistance of the variable resistor 9432. Hence the output voltage is $$VOUT = I \times (R3 + R_{eq}). \quad [EQ-27]$$

In a test mode, a target voltage and a test signal are applied to the output pad 96 and the enable pad 98, respectively. The test signal signals the enable circuit 9402 to generate a high-level enable signal EN1, by which the switches S0 and S3 in the LDO regulator 92 are turned on, the switches S1 and S2 are turned off, and the oscillator 9408 and a counter 9430 are enabled, and the target voltage is coupled to the inverting input of the comparator 9406 in the trim circuit 94. Because of virtual short, the voltage at the inverting input B of the error amplifier 9202 is equal to the reference voltage Vref, the current I flowing through the resistor R3 and the variable resistor 9432 is obtained as the equation EQ-26, and thereby the voltage at the non-inverting input A of the comparator 9406 is $$VA = I \times (R3 + R_{eq}). \quad [EQ-28]$$

The comparator 9406 compares the target voltage with the voltage $V_A$ to generate a comparison signal Scp, a AND gate 9424 in the logic circuit 9404 generates a signal Sc1 in response to the comparison signal Scp and the enable signal EN1 for a latch 9426 to generate a signal Sc2, the oscillator 9408 is enabled by the enable signal EN1 to provide a clock CLK, and a AND gate 9428 in the logic circuit 9410 generates a signal Sc3 in response to the signal Sc2 and the clock CLK for the counter 9430 to generate signals (Q2, Q1, Q0) for the control circuit 9412 to adjust the variable resistor 9432. After the voltage $V_A$ reaches the target voltage, the operation is like that of the power supply circuit 80. When the signal Q0, Q1, or Q2 is low-level, signal out1, out2, or out3 corresponding to the signal Q0, Q1, or Q2 is low-level to turn off switch MP0, MP1, or MP2. Switch P0, P1, or P2 is turned off by diode D0, D1, or D2 to latch the output state more efficiently to maintain the resistance $R_{eq}$ of the variable resistor 9432. According to the equation EQ-27, the resistance $R_{eq}$ of the variable resistor 8432 will influence the output voltage VOUT, and thereby the output voltage VOUT is trimmed.

In the power supply circuit 60 shown in FIG. 6, according to the designer's requirements, the polysilicon resistors may be replaced with Zener diodes or EPROMs as the fuses F0, F1, and F2.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A power supply circuit, comprising:
an output pad;

an enable pad for enabling said power supply circuit by receiving an enable signal in a normal mode;
a trim circuit; and
a voltage regulator for providing an output voltage to said output pad in said normal mode and providing a first voltage proportional to said output voltage for said trim circuit in a test mode;
wherein in said test mode, said enable pad receives a test signal to signal said trim circuit to perform a trim function, a second voltage is coupled to said output pad, and said trim circuit trims said output voltage in response to said first and second voltages.

2. The power supply circuit of claim 1, wherein said trim circuit comprises:
a comparator having a first input coupled with said second voltage and a second input coupled with said first voltage for comparing said first voltage with said second voltage to generate a comparison signal;
an enable circuit for generating a second enable signal in response to said test signal;
a first logic circuit for generating a first signal in response to said comparison signal and second enable signal;
an oscillator for being enabled by said second enable signal to generate a clock;
a second logic circuit for generating a plurality of second signals in response to said first signal and clock;
a variable resistor coupled to said voltage regulator; and
a control circuit for trimming said output voltage by adjusting said variable resistor in response to said first signal and plurality of second signals.

3. The power supply circuit of claim 2, wherein said first logic circuit comprises:
a AND gate for generating a third signal in response to said comparison signal and second enable signal; and
a latch for generating said first signal in response to said third signal.

4. The power supply circuit of claim 2, wherein said second logic circuit comprises:
a AND gate for generating a third signal in response to said first signal and clock; and
a counter for being enabled by said second enable signal to generate said plurality of second signals based on said third signal.

5. The power supply circuit of claim 2, wherein said voltage regulator comprises a low drop-out regulator.

6. The power supply circuit of claim 5, wherein said low drop-out regulator comprises:
a first switch;
a second switch coupled between said output pad and second input;
a third switch;
a fourth switch;
a transistor having a gate, a source, and a drain, said gate coupled to a reference voltage by said first switch, said source coupled to said output, said drain coupled to a third voltage; and
an error amplifier having a third input coupled with a fourth voltage and a fourth input coupled to said output pad by said second switch, said error amplifier generating said first voltage in response to voltages at said third and fourth inputs to couple to said gate of said transistor and said second input by said third and fourth switches, respectively;
wherein said first and fourth switches are turned off and said second and third switches are turned on in said normal mode, and said first and fourth switches are turned on and said second and third switches are turned off in said test mode.

7. The power supply circuit of claim 6, wherein said first, second, third, and fourth switches are controlled by said second enable signal.

8. The power supply circuit of claim 6, wherein said variable resistor is coupled to said output pad by said second switch.

9. The power supply circuit of claim 6, further comprising a current source for providing a current flowing through said variable resistor to generate said fourth voltage.

10. The power supply circuit of claim 2, wherein said control circuit comprises a plurality of fuses to permanently determine said resistance of said variable resistor in response to said first signal and plurality of second signals.

11. The power supply circuit of claim 10, wherein said fuses are polysilicon resistors.

12. The power supply circuit of claim 10, wherein said fuses are Zener diodes.

13. The power supply circuit of claim 10, wherein said fuses are erasable programmable read only memories.

14. The power supply circuit of claim 2, wherein said voltage regulator comprises a DC-to-DC converter.

15. The power supply circuit of claim 14, wherein said DC-to-DC converter comprises:
a first switch;
a second switch coupled with said first switch in series between a power source and a reference voltage;
a driver for generating a first driving signal and a second driving signal based on said first voltage to switch said first and second switches to generate said output voltage;
a third switch coupled between said first driving signal and a third voltage;
a fourth switch coupled between said output pad and second input;
a fifth switch;
a sixth switch;
a seventh switch coupled between said second driving signal and a fourth voltage; and
an error amplifier having a third input coupled with a fifth voltage varying with said output voltage and a fourth input coupled with a sixth voltage, said error amplifier generating said first voltage in response to said fifth and sixth voltages to couple to said driver and said second input by said fifth and sixth switches, respectively;
wherein in said normal mode, said third, sixth, and seventh switches are turned off and said fourth and fifth switches are turned on, and in said test mode, said third, sixth, and seventh switches are turned on and said fourth and fifth switches are turned off.

16. The power supply circuit of claim 15, wherein said third, fourth, fifth, sixth, and seventh switches are controlled by said second enable signal.

17. The power supply circuit of claim 15, wherein said variable resistor is coupled to said output pad by said fourth switch.

18. The power supply circuit of claim 2, wherein said variable resistor comprises:
a plurality of resistors coupled in parallel; and
a plurality of switches, each of said switches coupled to one of said plurality of resistors in series;
wherein said variable resistor is adjusted by said plurality of switches.

19. The power supply circuit of claim 2, wherein said variable resistor comprises:
a plurality of resistors coupled in series; and a plurality of switches, each of said switches coupled to one of said plurality of resistors in parallel;
wherein said variable resistor is adjusted by said plurality of switches.

20. A power supply circuit, comprising:
an output pad;
an enable pad for enabling said power supply circuit by receiving an enable signal in a normal mode;
a trim circuit;
a voltage regulator for providing an output voltage to said output pad in said normal mode and providing a first voltage proportional to said output voltage for said trim circuit in a test mode; and
a feedback pad for feeding back said output voltage to said power supply circuit;
wherein in said test mode, said enable pad receives a test signal to signal said trim circuit to perform a trim function, a second voltage is coupled to said output pad, and said trim circuit trims said output voltage in response to said first and second voltages.

21. The power supply circuit of claim 20, wherein said trim circuit comprises:
a comparator having a first input coupled with said second voltage and a second input coupled with said first voltage for comparing said first voltage with said second voltage to generate a comparison signal;
an enable circuit for generating a second enable signal in response to said test signal;
a first logic circuit for generating a first signal in response to said comparison signal and second enable signal;
an oscillator for being enabled by said second enable signal to generate a clock;
a second logic circuit for generating a plurality of second signals in response to said first signal and clock;
a variable resistor coupled to said voltage regulator; and
a control circuit for trimming said output voltage by adjusting said variable resistor in response to said first signal and plurality of second signals.

22. The power supply circuit of claim 21, wherein said first logic circuit comprises:
a AND gate for generating a third signal in response to said comparison signal and second enable signal; and
a latch for generating said first signal in response to said third signal.

23. The power supply circuit of claim 21, wherein said second logic circuit comprises:
a AND gate for generating a third signal in response to said first signal and clock; and
a counter for being enabled by said second enable signal to generate said plurality of second signals based on said third signal.

24. The power supply circuit of claim 21, wherein said voltage regulator comprises a DC-to-DC converter.

25. The power supply circuit of claim 24, wherein said DC-to-DC converter comprises:
a first switch;
a second switch coupled with said first switch in series between a power source and a reference voltage;
a driver for generating a first driving signal and a second driving signal based on said first voltage to switch said first and second switches to generate said output voltage;
a third switch coupled between said first driving signal and a third voltage;
a fourth switch coupled between said feedback pad and second input;
a fifth switch;
a sixth switch;
a seventh switch coupled between said second driving signal and a fourth voltage; and
an error amplifier having a third input coupled to said feedback pad by said fourth switch and a fourth input coupled with a fifth voltage, said error amplifier generating said first voltage in response to the voltage at said feedback pad and said fifth voltage to couple to said driver and said second input by said fifth and sixth switches, respectively;
wherein in said normal mode, said third, sixth, and seventh switches are turned off and said fourth and fifth switches are turned on, and in said test mode, said third, sixth, and seventh switches are turned on and said fourth and fifth switches are turned off.

26. The power supply circuit of claim 25, wherein said third, fourth, fifth, sixth, and seventh switches are controlled by said second enable signal.

27. The power supply circuit of claim 21, wherein said control circuit comprises a plurality of fuses to permanently determine said resistance of said variable resistor in response to said first signal and plurality of second signals.

28. The power supply circuit of claim 27, wherein said fuses are polysilicon resistors.

29. The power supply circuit of claim 27, wherein said fuses are Zener diodes.

30. The power supply circuit of claim 27, wherein said fuses are erasable programmable read only memories.

31. The power supply circuit of claim 21, wherein said variable resistor comprises:
a plurality of resistors coupled in series; and
a plurality of switches, each of said switches coupled to one of said plurality of resistors in parallel;
wherein said variable resistor is adjusted by said plurality of switches.

32. The power supply circuit of claim 21, wherein said variable resistor comprises:
a plurality of resistors coupled in parallel; and
a plurality of switches, each of said switches coupled to one of said plurality of resistors in series;
wherein said variable resistor is adjusted by said plurality of switches.

33. A control method for a power supply circuit, said power supply circuit including an output pad, an enable pad, a trim circuit, and a voltage regulator, said trim circuit having a variable resistor coupled to said voltage regulator, said voltage regulator providing an output voltage to said output pad in a normal mode and providing a first voltage proportional to said output voltage for said trim circuit in a test mode, said control method comprising the steps of receiving a test signal and a second voltage by said enable pad and said output pad, respectively, and trimming said output voltage by said test signal and said first and second voltages in said test mode.

34. The control method of claim 33, wherein said step of trimming said output voltage in said test mode comprises the steps of:
generating a comparison signal by comparing said first voltage with said second voltage;
generating a first signal based on said comparison signal and test signal;
providing a clock based on said test signal;
generating a plurality of second signals based on said first signal and clock; and
trimming said output voltage by adjusting said variable resistor based on said first signal and plurality of second signals.

35. The control method of claim 34, wherein said step of trimming said output voltage by adjusting said variable resistor comprises the step of determining states of a plurality of fuses based on said first signal and plurality of second signals to permanently determine said resistance of said variable resistor.

36. A control method for a power supply circuit, said power supply circuit including an output pad, an enable pad, a feedback pad, a trim circuit, and a voltage regulator, said trim circuit having a variable resistor coupled to said voltage regulator, in a normal mode, said voltage regulator providing an output voltage to said output pad, and said output voltage fed back to said power supply circuit by said feedback pad, in a test mode, said voltage regulator providing a first voltage proportional to said output voltage for said trim circuit, said control method comprising the steps of receiving a test signal and a second voltage by said enable pad and said output pad, respectively, and trimming said output voltage by said test signal and said first and second voltages in said test mode.

37. The control method of claim 36, wherein said step of trimming said output voltage in said test mode comprises the steps of:

generating a comparison signal by comparing said first voltage with said second voltage;

generating a first signal based on said comparison signal and test signal;

providing a clock based on said test signal;

generating a plurality of second signals based on said first signal and clock; and trimming said output voltage by adjusting said variable resistor based on said first signal and plurality of second signals.

38. The control method of claim 37, wherein said step of trimming said output voltage by adjusting said variable resistor comprises the step of determining states of a plurality of fuses based on said first signal and plurality of second signals to permanently determine said resistance of said variable resistor.

* * * * *